Sept. 1, 1931. S. FEILER 1,821,504
WOVEN BODY FOR DECORATIVE ARTICLES AND THE LIKE
Original Filed Aug. 22, 1928
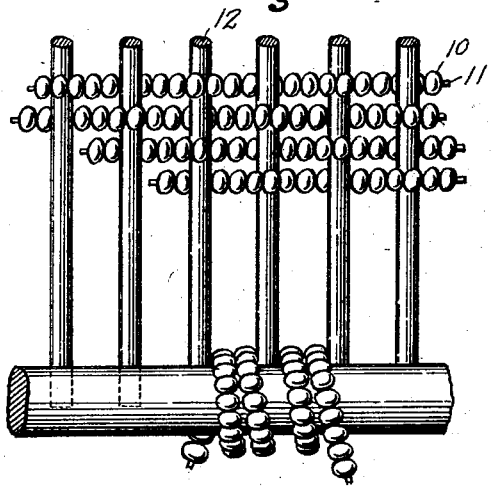
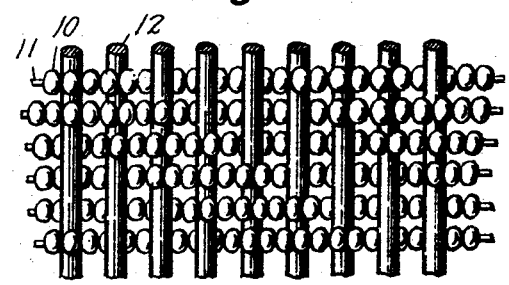
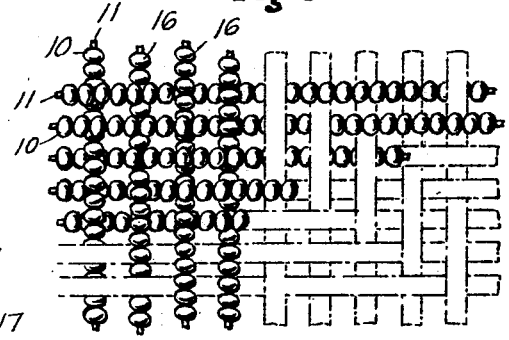
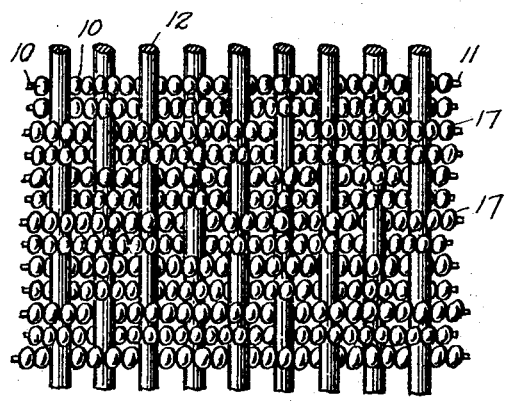
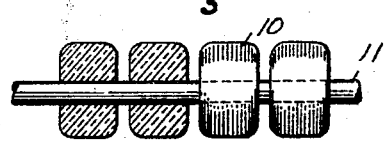
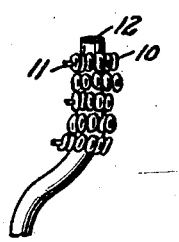
INVENTOR
*Saul Feiler*
BY
ATTORNEY Patented Sept. 1, 1931

1,821,504

UNITED STATES PATENT OFFICE

SAUL FEILER, OF NEW YORK, N. Y.

WOVEN BODY FOR DECORATIVE ARTICLES AND THE LIKE

Original application filed August 22, 1928, Serial No. 301,273. Patent No. 1,745,365, dated February 4, 1930. Divided and this application filed December 26, 1929. Serial No. 416,423.

This invention relates to woven bodies for various types of articles such as articles of furniture, decorative articles and the like, and relates further to such articles as may be made largely of strung beads partly for the purpose of producing variegated light and color effects, this application being a division of my co-pending application for decorative articles, Serial No. 301,273, filed August 22nd, 1928.

My invention contemplates the interweaving of strung beads to produce all or any part of the bodies of various types of articles such as, for instance, lamps, vases, chandeliers, chandelier globes, pocket books, jewelry boxes, furniture, baby carriages and similar articles, wherein woven reed or cane might have previously been used. Said beads are strung in advance on the stringing therefor, and may be made of glass, steel, bakelite or any other suitable material capable of producing the desired light and shade and variegated color effects hereinafter mentioned, the body so woven being substantially self-sustaining against shocks and distortion.

The various objects of my invention will be clear from the description which follows, and from the drawings, in which Fig. 1 is a front view of part of the body of an article, illustrating how my invention is applied to the weaving of said article, the spacing between the weft and warp members being exaggerated for the sake of clarity.

Fig. 2 is a similar view of the same, showing a modified form of the weave.

Fig. 3 is a similar view of the same, showing how strung beads may be employed for the warp members of the woven body.

Fig. 4 is a similar view of the same, showing another form of the weave.

Fig. 5 is a partial vertical section and front view of part of a string of beads, and Fig. 6 is a side view of part of the body of an article made in accordance with my invention, showing the shaped warp members.

In that practical embodiment of my invention which I have illustrated by way of example, suitable beads as 10 are strung in advance upon the wire or string 11. Said beads 10 may be of any suitable and preferably translucent or transparent colored or colorless material, such as coral, amber, glass, or the like, bakelite or other similar colorable and translucent material, or the beads may be made of polished steel or other suitable strong and partly or completely opaque material. The surfaces of the beads may be cut to provide facets as is well known in the art to make said beads sparkling or irridescent and to cause them to reflect light. The string 11 is made of material having sufficient tensile strength to resist breakage, such as for instance, wire, gut or other suitable material.

Referring now to Fig. 1, I have there shown a series of comparatively rigid warp members 12 which serve as the foundation for the woven body. Said members 12 are made of any suitable material, such as wire, reed, wood dowels or the like, and may be shaped in advance to the desired form, and spaced apart the proper distance to allow the interweaving of the strings of beads therewith. Said strings are sufficiently flexible to allow them to be easily handled and woven over and under the various warp members 12 to form what I would term the weft members of the body.

It will be understood that the spacing in the figure between the strings of beads has been exaggerated somewhat and that even though the weft members are woven as closely as possible across the warp members, small openings are left nevertheless throughout the body. Said openings have been utilized for various purposes such as for ventilation, and also for obtaining certain color effects when illuminated means is placed behind the body or otherwise in proximity thereto.

It will be understood that any type of weave or braid may be used in the formation of my new woven body, and that the weave illustrated in Fig. 1 is merely one example thereof.

My invention may also be applied to many other types of weaves which are well known in the art of caning, and need not therefore be described in detail. I have shown, however, other such forms of weaves in Figs. 2, 3 and 4 to indicate that the strung beads are well adapted to be so woven as to produce any desired design in a manner well known to those skilled in the caning art, and which, in view of the above, will now be obvious.

As illustrated in Fig. 2, I have shown a weave producing a diagonal design wherein the weft members are woven over three of the warp members and under the next three of the warp members alternately.

As shown in Fig. 3, I may substitute the strung bead members 16 for the comparatively stiff and comparatively inflexible warp members 12. Said bead members 16 thereby serve as the warp members to provide a woven body presenting a beaded appearance throughout, which, while adapted to be woven to the desired shape, is somewhat softer and more easily distortable than the body illustrated in Figs. 1 and 2. It will be understood, however, that the body shown in Fig. 3 is nevertheless self-maintained to a substantial degree against distortion not only due to the reinforcing action of the weft and warp members but also due to the transparent sizing coat which may be applied to the body thus woven, as will be more fully described hereinafter.

As illustrated in Fig. 4, I have shown a weave more or less well known for producing a diamond-shaped design. In that case, the strings 17 are carried under varying numbers of the warp members and over certain warp members, as will be clear to those skilled in the art.

It will be understood that beads of various colors and of varying degrees of translucency or opaqueness may be alternated in any desired manner on any particular string, and that different strings arranged across different rows of the warp members may have different colors, if desired, to accentuate the colorization of the resulting body, and that the warp members may also be made in variegated colors as desired. Illuminated means such as an electric lamp, when placed in proximity to or behind the body thus produced causes the light to be broken up by the facets of the beads, giving a variegated lighting effect. If illuminating means is placed behind the body, part of the light passes through the openings between the rows of beads and enhances the effect.

After the body has been woven in the manner above described, it may be glue-sized for maintaining the stiffness of the strung beads and preventing possible distortion of the body, particularly, where the warp members consist of strings of beads. It will be understood that any suitable material may be used for the sizing instead of glue, such as for instance, varnish, shellac and the like, though I prefer to use a material which becomes quite hard on drying, and which is transparent.

Articles made of my improved woven body may be dropped with impunity and are not likely to break or become distorted.

Such articles present a pleasing appearance by reason of the reflection of light therefrom, the varied light and shade effects thus produced, and the various colors in numerous designs which are obtainable from such weaving.

It will be seen that my improved woven body may be applied to a great variety of different articles which need not be specifically mentioned excepting to say that such a body is applicable to all articles which may be woven of reed or cane.

It will be understood that while I have shown and described specific embodiments of my invention, I do not intend to limit myself thereto, but that I intend to claim my invention as broadly as may be permitted by the state of the prior art and the terms of the appended claims.

I claim:

1. A shaped woven body for use in decorative articles including shaped warp members, and weft members of strung beads woven in and out directly across said warp members, and thereby bent into wave form, and transparent sizing for said members whereby the strings of beads are maintained substantially in the shape into which they are woven.

2. A woven beaded body, self-braced against substantial distortion, comprising strings of beads constituting the weft members and comparatively rigid means constituting the warp members for supporting said strings with the adjacent beads of the strings lying thereagainst and the strings crossing on opposite sides of spaced warp members at substantially right angles.

3. In a woven body, self-sustained against substantial distortion in any direction, a plurality of strings of beads, each including a stringing member adapted to resist tension, and beads strung on said stringing member, and in contact with adjacent beads of the string, warp members in contact with, lying between, and partly covered by said strings of beads, and transparent sizing material for stiffening said strings of beads and for maintaining said strings in the shape into which they are woven.

4. A woven body comprising a plurality of strings of beads, each of said strings including a stringing member and contacting beads of predetermined colors woven on said stringing member to produce a predetermined color effect and design, and means directly across which said strings are woven in and out for stiffening the body against distortion in any direction.

5. A shaped woven body resistant to shock, comprising a plurality of strings of beads bent to provide a series of small openings between adjacent rows of beads and spaced members arranged at right angles to and in direct contact with said strings and the faces of the beads thereof for stiffening the body against distortion, certain of the beads crossing and covering the front faces of the spaced members, and certain other beads crossing and covering the rear faces of said members.

6. A self-braced woven body of two sets of interwoven members, at least one set of said members comprising substantially parallel strings of beads woven directly across, in and out, and arranged with the beads thereof partly covering the other set and in contact therewith.

7. A woven body, self-maintained against substantial distortion, comprising spaced warp members, and weft members consisting of strings of beads of predetermined colors woven across, in front of, and behind said warp members and partly covering said warp members to present substantially the same appearance at the front and back of the body.

8. A woven body, self-maintained against substantial distortion, comprising strings of beads of different colors and substantially parallel and comparatively closely spaced warp members behind and in front of which said strings are woven for maintaining the shape of said article, said warp members being arranged at substantially right angles to said strings and the beads lying against and substantially covering said warp members.

9. In a foundationless beaded body, a series of cylindrical wooden members spaced apart and in substantially parallel relation, and a plurality of strings of beads arranged at substantially right angles to and lying on said members and interwoven in and out between, and in contact therewith, said members and said strings constituting the only elements in said body, and each of said strings of beads comprising a series of beads arranged in close contact and a wire passing through and completely concealed by the beads.

SAUL FEILER.